May 17, 1960  W. C. FALLIN ET AL  2,936,842
AUTOMOTIVE VEHICLE BODY CONSTRUCTION
Filed Oct. 24, 1958  2 Sheets-Sheet 1

INVENTORS
WILLIAM C. FALLIN
& CLARENCE D. GARCIA
BY
McMorrow, Berman & Davidson
ATTORNEYS May 17, 1960 W. C. FALLIN ET AL 2,936,842
AUTOMOTIVE VEHICLE BODY CONSTRUCTION
Filed Oct. 24, 1958 2 Sheets-Sheet 2
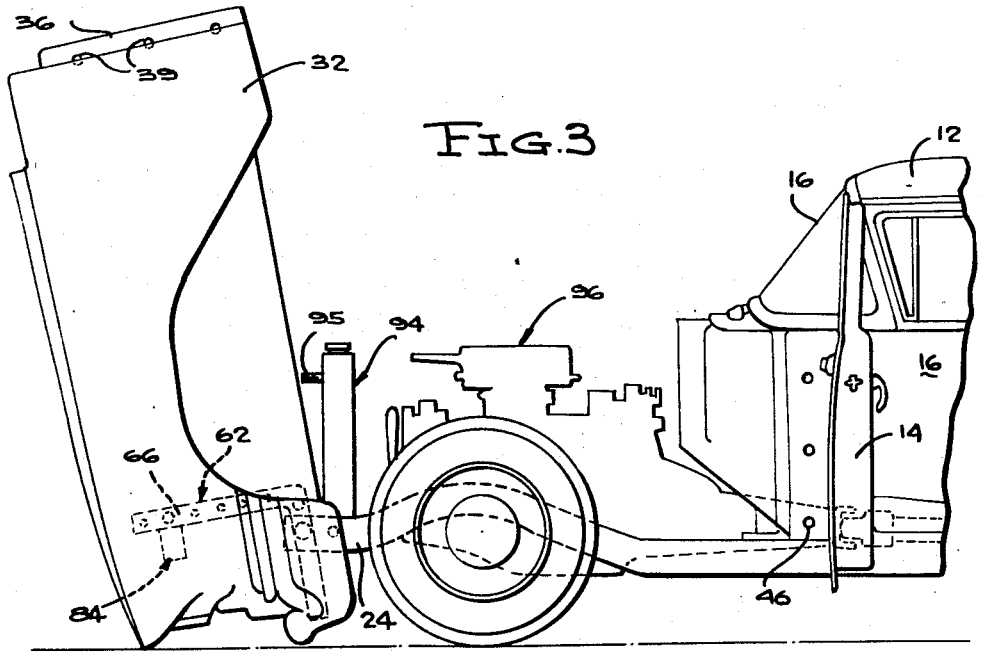
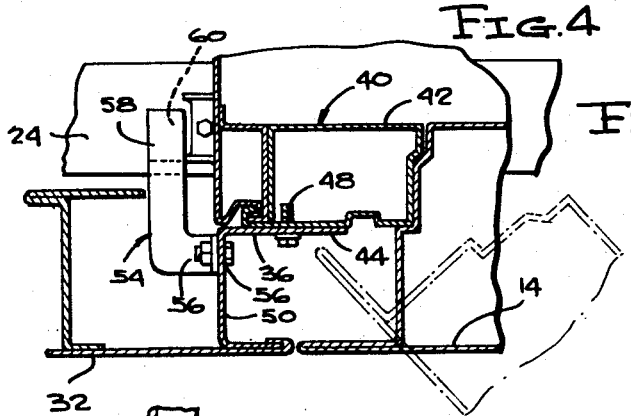
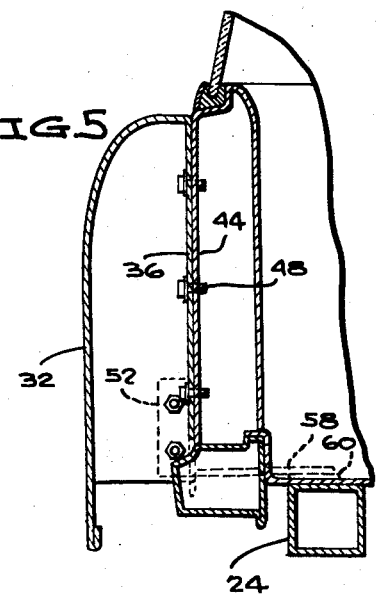
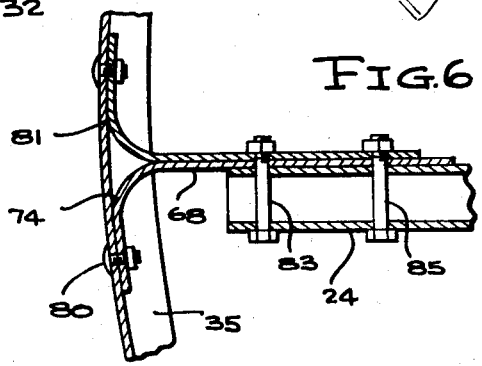
INVENTORS
WILLIAM C. FALLIN
& CLARENCE D. GARCIA
BY
McMorrow, Berman & Davidson
ATTORNEYS United States Patent Office 2,936,842
Patented May 17, 1960

2,936,842

AUTOMOTIVE VEHICLE BODY CONSTRUCTION

William C. Fallin and Clarence D. Garcia,
Midway Island, Va.

Application October 24, 1958, Serial No. 769,460

6 Claims. (Cl. 180—69)

The present invention appertains to improvements in automotive vehicles and is particularly directed to a new and novel body construction for a motor vehicle.

A primary object of the present invention is to form the bonnet or hood and fenders of a motor vehicle as one integral part or end body section, together with the grill work, with the bumper being carried by such integral part. Ancillary to this, it is an important object of the present invention to pivotally mount such formed part or end body section on the chassis or frame of the vehicle so that it may be swung, from a closed horizontal position, upwardly about an axis transverse to the longitudinal axis of the vehicle, into a substantially vertical position bodily disposed at one end of the chassis and positioned outwardly from such end and resting on the ground.

By so mounting the end body section, which includes the bonnet, fenders, and grill, it is possible to easily expose the entire engine and its associated operative parts, the mounting means for the wheels, steering mechanism and the like, so as to facilitate repairs thereto and also, to facilitate the complete inspection and display of such parts.

A further object of the present invention is to provide supporting brackets, which are pivotally carried by the frame members of the frame or chassis and which secure the one-piece body section to the main body section, so as to provide a tight, rattle-free and extremely strong entire body construction.

Another important object of the present invention is to form the hood or bonnet, so that it can be moved independently of the one-piece end body section, for the performance of routine maintenance such as oil and water checks, battery inspection, minor tuneups and the like.

It is also contemplated, as a further object of the present invention, to provide a one-piece engine compartment body section for a vehicle, which section may be preformed and assembled at a distant point of manufacture and subsequently shipped, as a one-piece unit, to the point of use. The result of such construction can measurably lessen the cost of extensive body repairs which are often required when the vehicle has been involved in a collision, or the like, by reducing the labor charge which would result if it became necessary to replace the aforesaid body section in piecemeal fashion.

A further object of the present invention is to provide a one-piece, end body section, which is pivotally connected to the outer end of the frame of the motor vehicle in such a way that it may be bodily swung about an axis transverse to the longitudinal axis of the vehicle from a closed position into an open position, wherein it is disposed substantially vertical and rests on the ground, with the ground supporting the entire weight of the end body section so that such weight is not borne by the frame or chassis.

The foregoing and ancillary objects, including the provision of a compact, sturdy and inexpensively constructed and assembled one-piece, end body section for a motor vehicle, are attained by this invention, the preferred embodiment of which is set forth in the following description and illustrated in the accompanying drawings, wherein:

Figure 3 is a side elevational view, similar to that of Figure 2, with the end body section shown in its open position;

Figure 4 is an enlarged, detail cross-sectional view taken substantially on line 4—4 of Figure 2;

Figure 5 is an enlarged, detail cross-sectional view taken substantially on line 5—5 of Figure 2; and Figure 6 is an enlarged, fragmentary cross-sectional view taken substantially on line 6—6 of Figure 2.

Figure 1:
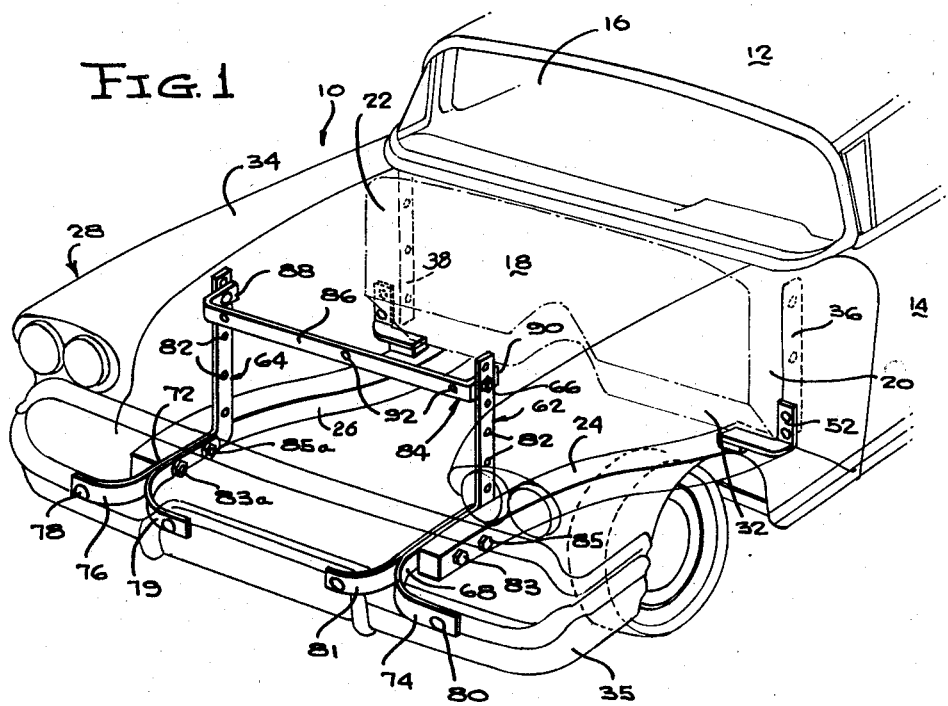
Figure 1 is a fragmentary perspective view of a motor vehicle, showing the frame in solid lines and illustrating in detail the attaching means for securing the one-piece body section, which is shown in phantom lines, onto the frame or chassis so that it may be moved from a closed, horizontal position into an open, vertical position, about an axis transverse to the longitudinal axis of the vehicle.

Referring now more particularly to the accompanying drawings, the reference numeral 10 generally designates the vehicle, which may be of any type, make or style.

As stated in the foregoing, the vehicle body construction of the present invention contemplates the provision of a one-piece, removable end body section, whereby access to the engine compartment and associated parts of the vehicle is made readily available. In view of the fact that a majority of motor vehicles and trucks have the engine compartment disposed forwardly of the main body section, the present embodiment, chosen for illustration and description herein, is made with this construction. However, it will be understood that in those vehicles wherein the engine compartment is disposed rearwardly of the main vehicle body section, this invention is equally applicable thereto.

The vehicle 10 includes a main body section 12, which may be in the form of a truck or passenger body and which includes side doors 14 and 16 and a fire panel 18, having opposite sides 20 and 22, all of conventional construction and design.

The main body section is suitably mounted on a conventional type of frame or chassis, which includes a pair of substantially parallel, longitudinally extending frame members 24 and 26.

The one-piece, forward or front end body section 28 of the vehicle includes a bonnet or hood 30 which is pivotally connected to the section 28 in conventional fashion. Fenders 32 and 34 and a front bumper 35 are also provided. The fenders 32 and 34 are each provided with a substantially rectangular, rearward extension panel 36 and 38, respectively, such panels having vertically spaced openings 39 formed therein for a purpose to be described.

Figure 2:
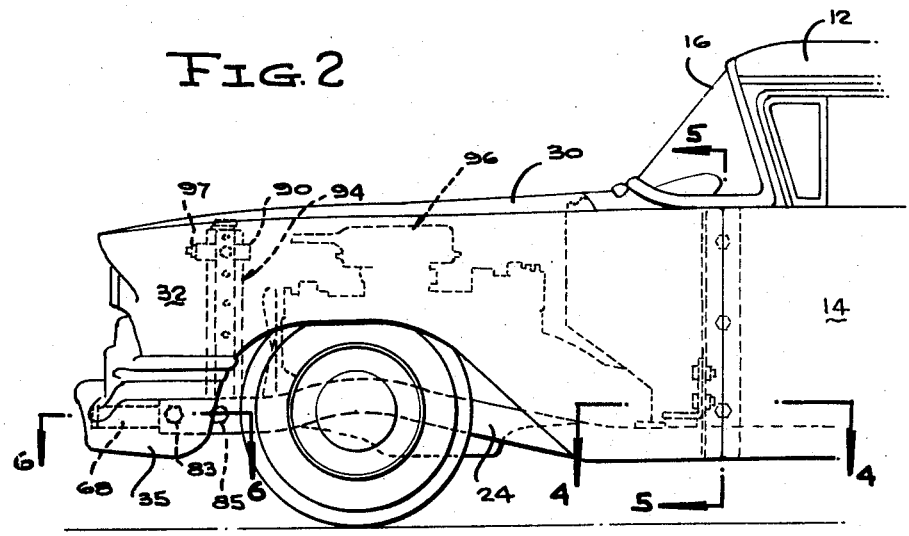
Figure 2 is a side elevational view, with the end body section shown in full lines and the parts of the vehicle and mounting structure being shown in dotted lines.

As seen in Figure 4, the side wall 20 terminates at a substantially hollow, rectangular door stanchion 40 having an inner wall 42 and outer wall 44. The outer wall 44 is provided with a plurality of vertically spaced threaded openings 46 which are co-aligned with the openings 39 in the extension 36 when the front end body section 28 is in the closed position, as shown in Figures 1 and 2. A plurality of bolts 48 are passed through the openings 39 for threaded engagement in the openings 46.

At this point it should be explained that the means for effecting the connection of the extension 38 to the side of the vehicle body having the door 16 is identical to the means hereinbefore described for connecting the extension 36 to the side of the body having the door 14.

The fenders 32 and 34 are each provided with a vertical inwardly extending end panel 50 which is formed integrally therewith and is provided with vertically spaced openings adjacent its lower end. A substantially rectangular plate 52 is secured flush against the inner side of the panels 50 and has an L-shaped support member 54, including an inner leg 56 and an outer leg 58 formed integrally with the lower end thereof, the leg 58 being substantially perpendicular to the plate 52. The outer or lower face of the leg 58 has a substantially rectangular pad 60, formed of rubber or other resilient material, fixedly superimposed thereon. As seen in the drawings, the pad 60 rests on the upper side of the frame members when the forward body 28 is in its closed position.

Each of the frame members 24, 26 has an L-shaped main support member 62, 64 secured thereto. The support member 62 has a leg 66 and a foot 68 while the member 64 includes a leg 70 and a foot 72, and the respective feet 68 and 72 have integrally formed, outwardly curved bumper mounting brackets 74, 76 which are bolted to the bumper 35 at 78 and 80, respectively. Arcuate, inwardly turned auxiliary bumper brackets 79 and 81 also are provided as shown, and it is seen, with special attention to Figure 6, that a pair of bolts 83, 85 having conventional nuts affixed thereto serve to connect the foot 68 and bracket 81 to the frame 24. The bolts 83 and 85 and their associated nuts are normally securely tightened, and the foot 72 and bracket 79 are likewise secured to the frame member 26 by way of bolts 83a, 85a, also normally securely tightened.

It is also seen, with special reference to Figure 1, that the leg members 66 and 70 are each provided with a plurality of vertically spaced openings 82 in order that the aforesaid leg members may be secured to the inner panels of the fenders 32, 34, respectively, by means of bolts or the like fasteners (not shown).

A U-shaped radiator support 84 including a bight 86 and spaced apart parallel arms 88, 90 is provided, and, referring once again to Figure 1, it is seen that the arms 88, 90 are secured to the legs 66, 70, respectively at the upper ends thereof. The bight 86 has a plurality of horizontally spaced apertures 92 formed therein whereby the bight may be releasably secured to the radiator 94, which is provided with a like plurality of outwardly extending bolts 95, by passing the aforesaid bolts through the aperture for connection with conventional nuts 97. The radiator 94 may be either pivoted with the unit 28, in which case its hose connections (not shown) are removed and the bolts 95 and nuts 97 left in place, or the nuts 97 may be removed and the body section 28 pivoted free of the aforesaid radiator.

As previously stated, one of the important advantages inherent in the construction of the present vehicle body structure is that access is afforded to one wishing to repair or replace the engine 96 of the vehicle (see Figure 3) or to perform work on any other part of the vehicle located in the forward section thereof. In utilizing the body construction here chosen for illustration for this purpose, the first step is to open the vehicle doors 14, 16, as shown by phantom lines in Figure 4, and remove the bolts 48 from engagement with the stanchion 40. Secondly, the bolts 85 and 85a are removed from the foot members 68, 72 and the bolts 83, 83a are loosened from their normally tight connection with their associated nuts in order to perform the function of providing pivot members; and the hose connections for the radiator 94 are disconnected therefrom, if it is desired to pivot the radiator. As a final step, the forward body 28 is manually pivoted to the position shown in Figure 3, the pivot point being at the bolts 83, 83a and it will be noted the entire section 28 pivots away from the longitudinal axis of the vehicle 10. Re-assembly is accomplished by merely reversing the foregoing procedure.

Having described and illustrated one embodiment of this invention in complete detail, it will be understood that this embodiment is offered merely by way of example, and that this invention is to be limited only by the scope of the appended claims.

What is claimed is:

1. In a vehicle, a frame including laterally spaced, longitudinally extending frame members, a main body section mounted on the frame and spaced from one end thereof, an end body section including a hood assembly having fenders provided on the sides thereof and having a grill unit at the outer end thereof, substantially L-shaped brackets mounted on the frame members adjacent the outer ends thereof, each of said brackets including angularly related first and second arms, said first arms being disposed alongside the frame members, a pivot element transversely extending through each frame member inwardly of its end and through each first arm intermediate its ends for pivotally mounting the brackets on the frame members for pivotal movement of the brackets about aligned axes transverse to the longitudinal axis of the frame, said second arms normally upstanding from the frame members, means attaching the second arms of the brackets to the end body section so that the end body section is bodily movable from a horizontal position, complemental to the main body section, into a substantially vertical position disposed outwardly from the frame end, and means locking the end body section in its horizontal position, said last means including fasteners passing transversely through the frame members and the first arms when said first arms lie in horizontal positions alongside the frame members, thereby securing the brackets against pivotal movement, and also including bracket means carried by the inner end of the end body section and means releasably fastening said bracket means to the main body section.

2. In a vehicle, a frame including laterally spaced, longitudinally extending frame members, a main body section mounted on the frame and spaced from one end thereof, an end body section including a hood assembly having fenders provided on the sides thereof and having a grill unit at the outer end thereof, substantially L-shaped brackets mounted on the frame members adjacent the outer ends thereof, each of said brackets including angularly related first and second arms, said first arms being disposed alongside the frame members, means pivotally attaching the first arms to the frame members for pivotal movement of the brackets about aligned axes transverse to the longitudinal axis of the frame, said second arms normally upstanding from the frame members, means attaching the second arms of the brackets to the end body section so that the end body section is bodily movable from a horizontal position, complemental to the main body section, into a substantially vertical position disposed outwardly from the frame end, and means locking the end body section in its horizontal position, said last means including fasteners passing transversely through the frame members and the first arms when said first arms lie in horizontal positions juxtaposed alongside the frame members, thereby securing the brackets against pivotal movement, and also including bracket means carried by the inner end of the end body section and means releasably fastening said bracket means to the main body section, and said bracket means having lateral, inturned feet provided on their underside with cushioning means and adapted to seat on the frame members.

3. In a vehicle, a frame including laterally spaced, longitudinally extending frame members, a main body section mounted on the frame and spaced from one end thereof, an end body section including a hood assembly having fenders provided on the sides thereof and having a grill unit at the outer end thereof, brackets mounted on the frame members adjacent the outer ends thereof, each of said brackets having angularly related first and second arms, said first arms lying alongside the frame members and positionable in horizontal planes in parallel alignment with the frame members and said second arms normally upstanding from the frame members, means mounting the first arms of the brackets to the adjoining frame members for pivotal movement of the brackets about aligned axes transverse to the longitudinal axis of the frame, means attaching the second arms of the brackets to the end body section so that the end body section is bodily movable from a horizontal position, complemental to the main body section, into a substantially vertical position disposed outwardly from the frame end, and means locking the end body section in its horizontal position, said last means including fasteners attached to the frame members and the first arms for securing the brackets against pivotal movement, a radiator mounted between the frame members and a transverse member extending transversely between and connected to the second arms of the brackets and means attaching the radiator to the transverse member for stabilizing the end body section in its horizontal position and permitting the radiator to be carried by the end body section when it is moved to its vertical position.

4. In a vehicle, a frame including laterally spaced, longitudinally extending frame members, a main body section mounted on the frame and spaced from one end thereof, an end body section including a hood assembly having fenders provided on the sides thereof and having a grill unit at the outer end thereof, brackets mounted on the frame members adjacent the outer ends thereof, each of said brackets having first and second angularly related arms, said first arms in their normal horizontal positions lying alongside the frame members and the second arms upstanding from the frame members, said first arms having free ends extending axially beyond the ends of the frame members in the horizontal position of the first arms, means mounting the first arms of the brackets to the frame members for pivotal movement of the brackets about aligned axes transverse to the longitudinal axis of the frame, means attaching the second arms of the brackets to the end body section so that the end body section is bodily movable from a horizontal position, complemental to the main body section, into a substantially vertical position disposed outwardly from the frame end, and means locking the end body section in its horizontal position, said last means including fasteners transversely attached to the frame members and the first arms for securing the brackets against pivotal movement, a bumper disposed transversely in front of the grill, said free ends of the first arms being laterally offset and means attaching the bumper to the laterally offset free ends.

5. In a vehicle which includes a frame having laterally spaced, longitudinally extending frame members, and a main body section mounted on the frame and spaced from one end thereof; an end body section including a hood assembly and a bumper extending transversely of its outer end, a radiator mounted between the frame members, and means for mounting the end body section so that it is movable bodily from a horizontal position, complemental to the main body section, into a generally vertical position in which it is disposed outwardly of the frame; that improvement in said means which comprises a substantially L-shaped bracket pivotally secured adjacent the outer end of each of said frame members, each of said brackets including an elongated vertical arm which extends vertically adjacent the respective sides of the radiator and a horizontal arm which lies alongside the respective frame member and terminates at its outer end in a curved bumper mounting end projecting outwardly of the frame, said bumper mounting ends being fixedly secured to said bumper, a radiator support member releasably secured to the upper ends of said vertical arms and extending transversely therebetween, means releasably securing said support member to said radiator, and means locking the end body section in its horizontal position.

6. The improvement of claim 5 wherein said means locking said body section in its horizontal position includes fasteners extending through said frames and said horizontal arms, and further includes bracket means secured to the inner end of the end body section on each side thereof and means releasably fastening said bracket means to the main body section, and said bracket means having lateral, inturned feet provided on their underside with cushioning means and adapted to seat on the frame members.

References Cited in the file of this patent

UNITED STATES PATENTS

| 2,306,348 | Spear | Dec. 22, 1942 |
| 2,502,622 | Harris | Apr. 4, 1950 |

FOREIGN PATENTS

| 670,274 | Great Britain | Apr. 16, 1952 |